(12) United States Patent
Eckers et al.

(10) Patent No.: US 7,325,550 B2
(45) Date of Patent: Feb. 5, 2008

(54) APPLICATOR FOR LIQUID OR PASTE-LIKE MEDIA, IN PARTICULAR DECORATIVE COSMETICS SUCH AS MASCARA

(75) Inventors: Lorenz Eckers, Tostedt (DE); Jochen Zerck, Barsbüttel (DE)

(73) Assignee: Beiersdorf AG, Hamburg (DE)

( * ) Notice: Subject to any disclaimer, the term of this patent is extended or adjusted under 35 U.S.C. 154(b) by 489 days.

(21) Appl. No.: 10/250,745

(22) PCT Filed: Jan. 16, 2002

(86) PCT No.: PCT/EP02/00371

§ 371 (c)(1),
(2), (4) Date: Nov. 11, 2003

(87) PCT Pub. No.: WO02/056726

PCT Pub. Date: Jul. 25, 2002

(65) Prior Publication Data

US 2005/0034740 A1   Feb. 17, 2005

(30) Foreign Application Priority Data

Jan. 19, 2001 (DE) ................... 101 02 219

(51) Int. Cl.
*A45D 40/26* (2006.01)

(52) U.S. Cl. .................................... 132/218

(58) Field of Classification Search ........... 132/218, 132/320; 401/286, 129, 126, 122; 15/187, 15/188, 160, 206, 207
See application file for complete search history.

(56) References Cited

U.S. PATENT DOCUMENTS

| 3,892,248 | A | | 7/1975 | Kingsford |
| 4,498,490 | A | * | 2/1985 | Seidler ................ 132/218 |
| 4,635,659 | A | | 1/1987 | Spatz |
| 4,964,429 | A | | 10/1990 | Cole |
| 6,581,610 | B1 | * | 6/2003 | Gueret ................ 132/218 |
| 6,616,366 | B1 | * | 9/2003 | Weihrauch ............ 401/286 |

FOREIGN PATENT DOCUMENTS

| DE | 25 59 273 | 12/1975 |
| DE | 80 10 740 | 8/1980 |
| DE | 32 19 836 | 12/1982 |
| EP | 0 038 524 | 8/1985 |
| EP | 0 474 934 | 3/1992 |
| EP | 1 070 468 | 1/2001 |
| WO | WO 00 54 623 | 9/2000 |

* cited by examiner

*Primary Examiner*—Robyn Doan
(74) *Attorney, Agent, or Firm*—Paul Vincent

(57) ABSTRACT

An applicator for liquid or pasty media, in particular for decorative cosmetics such as mascara has a rod-shaped reinforcing core of a first plastic material which is surrounded at least in the region of its front end by a support sleeve of a second plastic material. The support sleeve has a plurality of radially outwardly projecting fingers which are integrally formed on the support sleeve and also consist of the second plastic material. Several fingers which are distributed over the periphery of the support sleeve form a finger collar and a plurality of finger collars with identical finger number are disposed one behind the other in the longitudinal direction of the support sleeve. A particular combination of parameters for the bristles leads to improved combing and application properties.

25 Claims, 5 Drawing Sheets

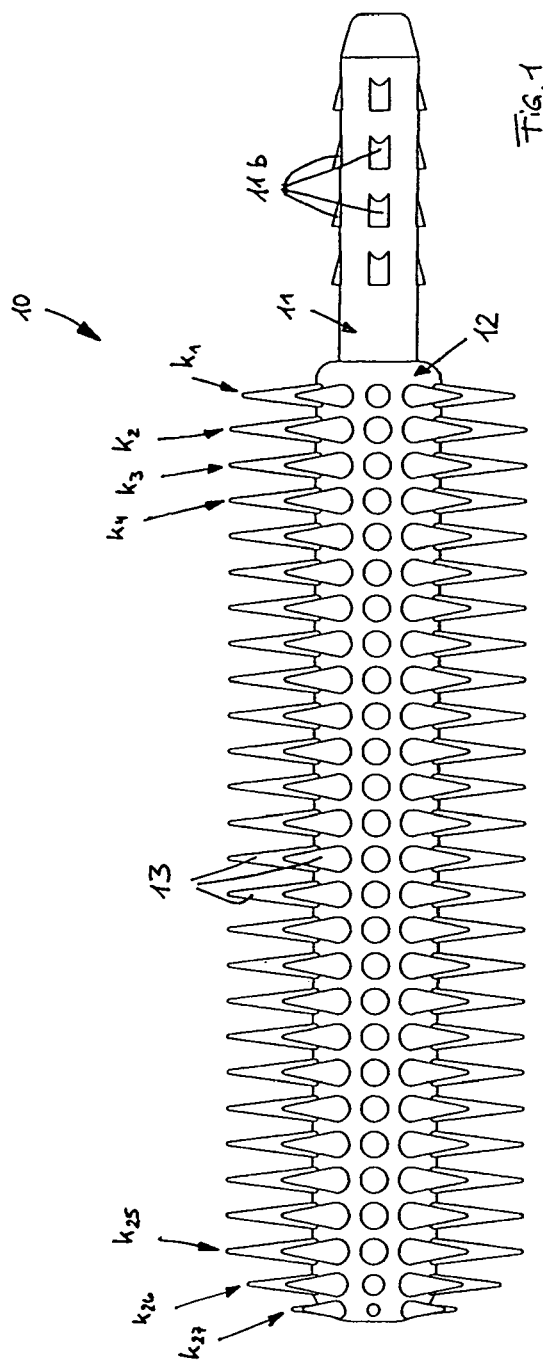
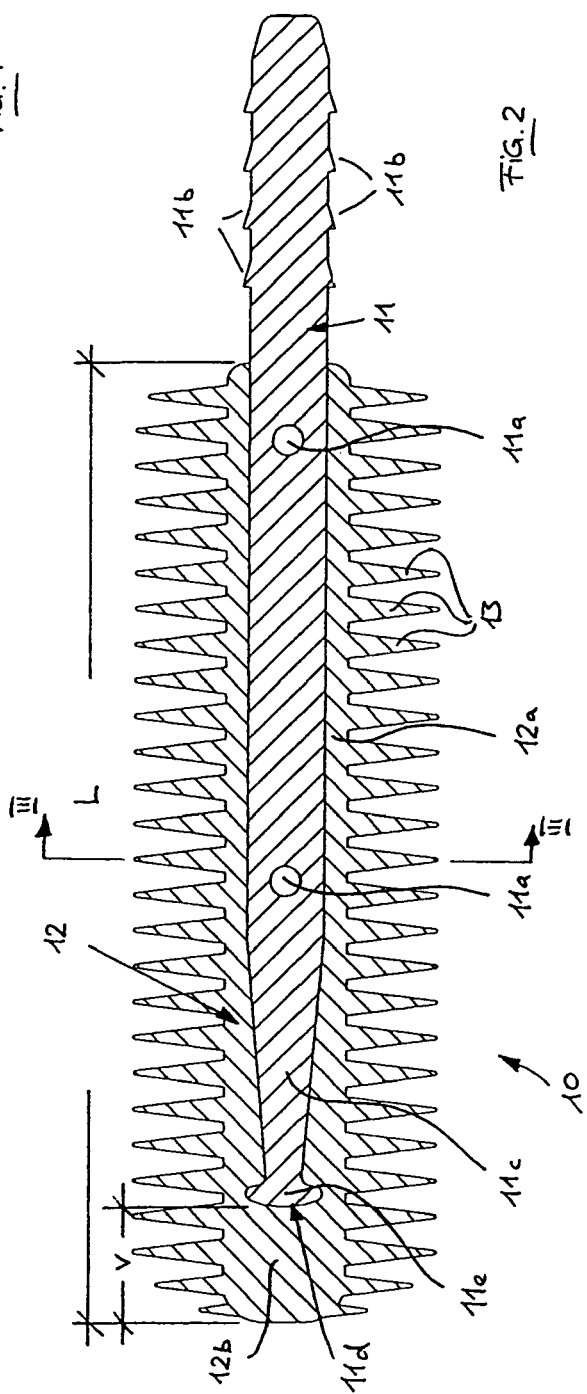
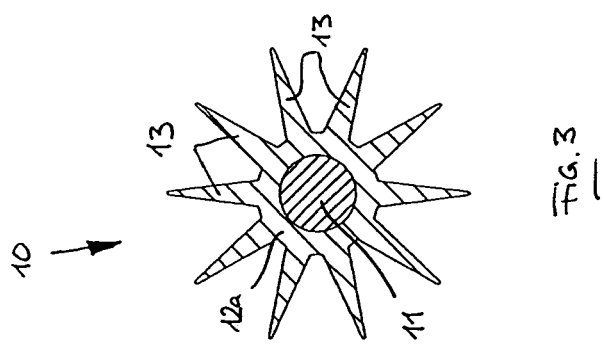

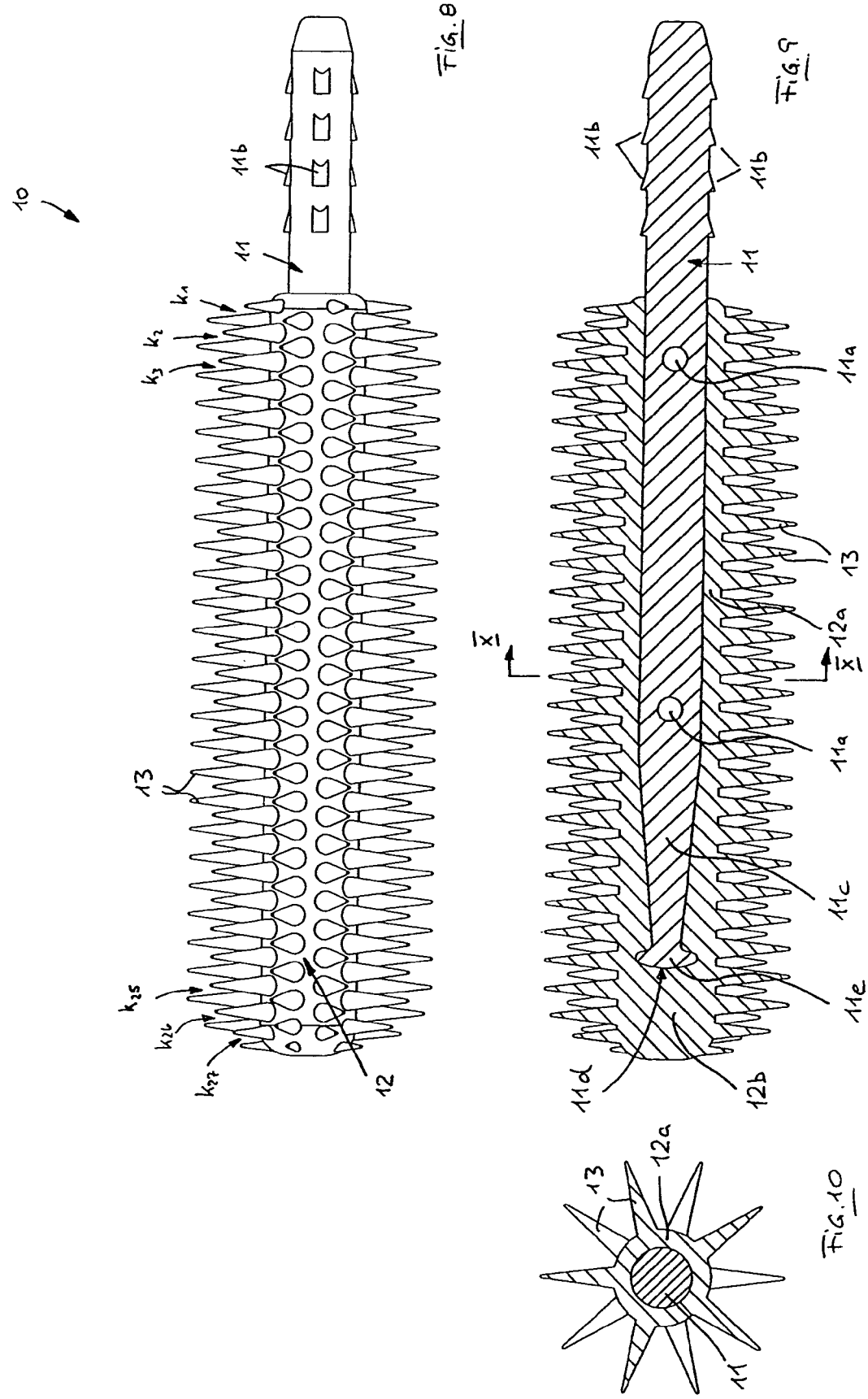

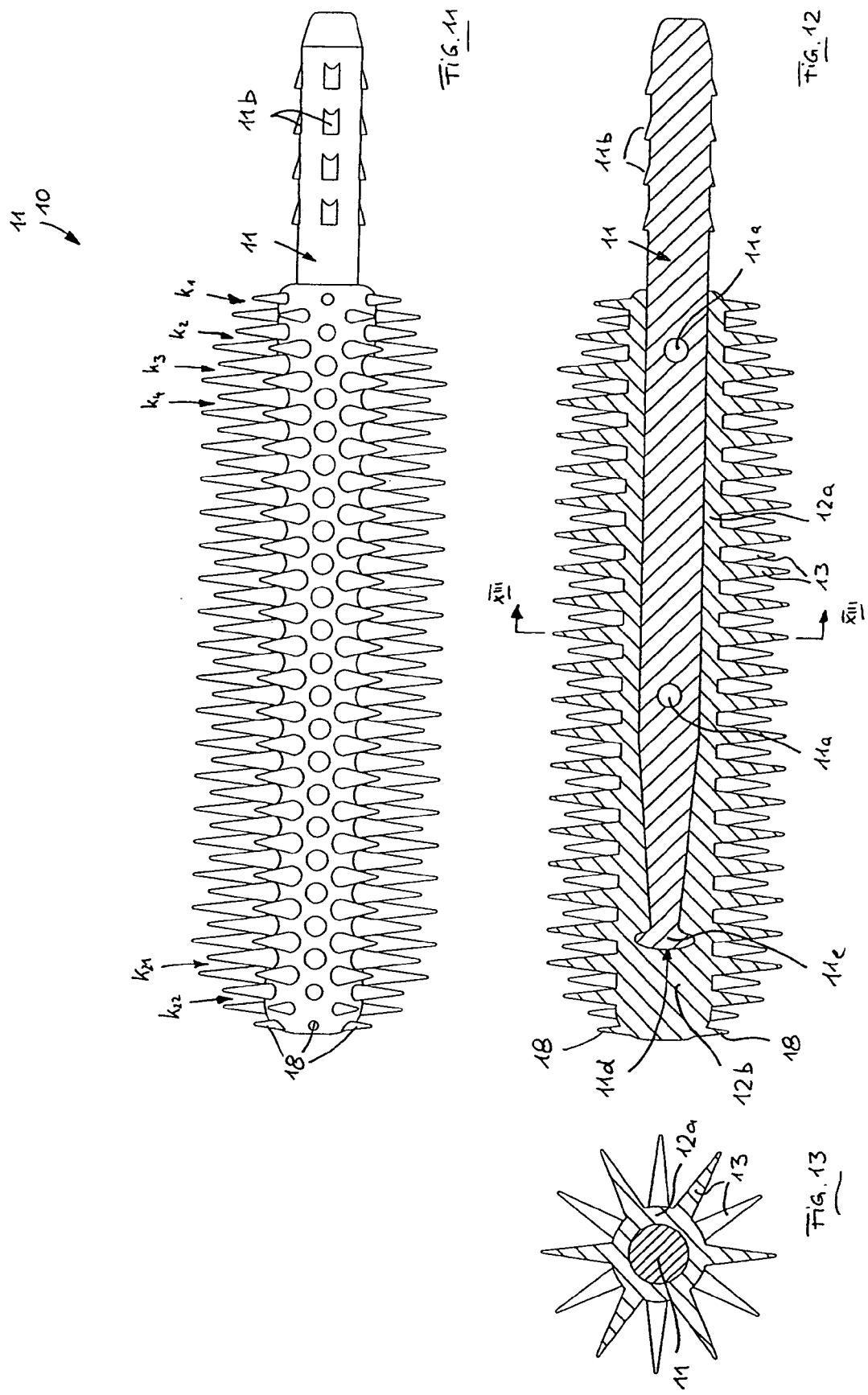

APPLICATOR FOR LIQUID OR PASTE-LIKE MEDIA, IN PARTICULAR DECORATIVE COSMETICS SUCH AS MASCARA

BACKGROUND OF THE INVENTION

This application is the national stage of PCT/EP02/00371 filed on Jan. 16, 2002 and also claims Paris Convention priority of DE 101 02 219.0

The invention concerns an applicator for liquid or pasty media, in particular for decorative cosmetics such as mascara, comprising a rod-shaped reinforcing core of a first plastic material which is surrounded, at least in the region of its front end, by a support sleeve of a second plastic material, which comprises a plurality of radially outwardly projecting fingers which are integrally formed on the support sleeve and are made from the second plastic material, wherein several fingers, which are distributed over the periphery of the support sleeve, form a finger collar and wherein a plurality of N finger collars having the same number of fingers n are disposed one behind the other in the longitudinal direction of the support sleeve.

Such an applicator can be used in different fields of application. Application of mascara is described by way of example below. The inventive applicator can also be used for coloring hair stands or applying pharmaceuticals.

An applicator for mascara should assure that the mascara can be applied in a simple and uniform fashion. Towards this end, the applicator must initially comb the eyelashes before applying the mascara thereby orienting them in the desired fashion. Moreover, the applicator should be able to receive sufficient mascara to be able to color all eyelashes without having to insert the applicator several times into the mascara supply container. To ensure that the mascara is applied uniformly and without splashing, one must ensure that the applicator does not carry an excessive amount of mascara. For this reason, the applicator is usually wiped on the mascara supply container when being removed from the container. Since the applicator is formed as a freely protruding component with a handle at one end, it must have sufficient stability to be able to safely accommodate the forces acting during use, without breaking. The applicator must, however, be sufficiently flexible to adjust to the curvature of the eyelids and to sufficiently bend in response to improper use to prevent injuries to the eye region of the user.

Up to now, a mascara applicator has conventionally been produced from several wires (U.S. Pat. No. 4,982,838) between which a plurality of short bristles is disposed. The bristles are fixed between the wires through twisting of the wires. A twisted applicator brush of this type has the substantial disadvantage that, due to the compact configuration of the bristles, during use, a considerable portion of the mascara is retained in the gaps formed between the bristles in which impurities, e.g. spores or bacteria may develop. Moreover, uniform combing of the eyelashes is not possible with such an applicator brush due to the plurality of densely packed bristles, since the bristles cannot engage with the eyelashes to produce a combing effect. Moreover, production of a twisted applicator brush is relatively expensive since the wires and the bristles must be produced individually and the bristles must subsequently be twisted into the wires requiring constructively demanding systems. The bristle ends must also be deburred and ground to avoid sharp-edged ends and eliminate any associated risk of injury. An additional disadvantage of twisted applicator brushes is that the metal soul formed by the twisted metal wires can kink during use which renders the applicator brush useless and also presents a great risk to the eye region of the user.

WO 00/54623 discloses an applicator developed to avoid the disadvantages of twisted applicator brushes with bristle stock. That applicator has a reinforcing rod-shaped core onto which an elastomeric plastic jacket is injected in the shape of a support sleeve with integrally formed fingers which project radially outwardly. The fingers have a cross-section which tapers towards their free ends. In this configuration, the fingers have a larger mutual separation at their free ends than in their lower foot regions where they are connected to the support sleeve. Due to the relatively large separation between the free support ends, no or only a small amount of mascara is received in the region of the tips which may be nearly completely removed by the conventional wiper. The tip region of the fingers therefore contains substantially no mascara during use of the applicator and merely combs the eyelashes before they contact the mascara provided in the foot region of the fingers. The relatively small separation between neighboring fingers in their foot region permits accommodation of a sufficiently large amount of mascara to avoid repeated insertion of the applicator into the supply container. It has turned out, however, that the combing action and the application of mascara depend on the constructive design of the applicator and, in particular, on the number, design and configuration of the fingers and not all applicators of the mentioned type obtain satisfactory results.

It is therefore the underlying purpose of the invention to further develop an applicator of this type to ensure an improved combing action and also good and uniform application of the medium to be applied.

SUMMARY OF THE INVENTION

This object is achieved in accordance with the invention with an applicator of the above-mentioned type by the parameter combination recited in the independent claim.

All finger collars should have the same number of fingers which are preferably uniformly distributed about the periphery of the support sleeve, i.e. have identical mutual angular separations. The inventive applicator has n fingers per finger collar, wherein n is between 8 and 16. An even number n of fingers (8, 10, 12 or 16 fingers) is preferred.

While the number n of fingers per finger collar determines the density of the fingers in the peripheral direction, the density of the fingers in the longitudinal direction of the support sleeve and thereby of the applicator is determined by the number N of the finger collars disposed, one behind the other, in the axial direction. The separation between neighboring finger collars should be within a predetermined range and the number of finger collars should not be excessively high to maintain easy handling of the applicator and to provide good mascara application, even when the eyelashes are relatively short. The invention therefore provides that the applicator has between 14 and 30 finger collars and in particular between 20 and 27 finger collars.

The fingers of all finger collars may have the same sizes. It has turned out to be advantageous to form finger collars with fingers of reduced size at the front and rear ends of the applicator. Although these finger collars with smaller fingers are included in the number N of finger collars, the following embodiments refer to the fingers of a normal finger collar in the central region. The length l of the fingers, i.e. the degree by which the finger projects past the support sleeve in a radial direction, is between 1.5 mm to 3.0 mm.

The mutual separation $s_1$ of neighboring finger collars is a parameter which considerably influences the combing action and mascara application. In accordance with the invention, the separation $s_1$ measured between the free ends of similar fingers of neighboring finger collars should be between 0.6 mm and 1.5 mm.

The fingers of neighboring finger collars in the region of the finger feet, i.e. in the connecting region between the fingers and support sleeve, should have a clearance separation $s_2$ of between 0.2 mm and 0.5 mm.

A first embodiment of the invention provides that the applicator has the following parameter combination:

| I.   | n = 10         |
| ---- | -------------- |
| II.  | N = 27         |
| III. | l = 2.4 mm     |
| IV.  | $s_1$ = 0.95 mm |
| V.   | $s_2$ = 0.25 mm |

In a further possible embodiment, the parameters, in combination, assume the following values:

| I.   | n = 12         |
| ---- | -------------- |
| II.  | N = 22         |
| III. | l = 2.4 mm     |
| IV.  | $s_1$ = 1.2 mm  |
| V.   | $s_2$ = 0.42 mm |

The applicator has a substantially circular cylindrical configuration, i.e. an envelope surface of the applicator has a circular cross-section which is either constant along the entire length of the finger field or, as mentioned above, is only reduced in its end regions. For practical handling of the applicator, it has turned out to be advantageous when its outer diameter D is between 6.0 mm and 10.0 mm and in particular 8.0 mm.

The reinforcing, rod-shaped core preferably has a circular cross-section of a diameter of between 1.5 mm and 2.5 mm and in particular 2.0 mm. The core may have a constant cross-section along its entire length. However, the core preferably tapers at its front end.

The rod-shaped core may be straight or alternatively be curved in which case a "banana shape", i.e. a continuous curvature in one direction is preferred.

The wall thickness a of the support sleeve substantially defines the elastic bearing of the fingers and thereby their flexibility. The radial wall thickness a of the support sleeve should be between 0.3 mm and 1.0 mm, and in particular 0.6 mm, in the region where the core has a constant cross-section. When the core tapers at its front end, the wall thickness a of the support sleeve is correspondingly enlarged in this region such that the outer contour of the support sleeve is circularly cylindrical.

The applicator is preferably produced in a two-component method. In a first step, the rod-shaped core is injected from a first plastic material and an elastomeric second plastic material is subsequently injected onto the core in a second step to form the support sleeve and fingers.

The overall axial length L of the support sleeve should be between 20.0 mm and 35.0 mm and preferably 25.0 mm.

In accordance with the invention, the front region of the applicator may have increased flexibility. This can be effected when the front end section of the support sleeve projects past the front end of the core by a value v, such that the front end section of the applicator is completely made from the elastomeric second plastic material. The value v can be between 1.0 mm and 8.0 mm and is preferably 3.0 mm.

In the most simple geometric design, the middle axes of the fingers of each finger collar lie in a common plane which extends perpendicular to the longitudinal direction of the applicator such that the individual fingers are not offset in the longitudinal direction of the support sleeve or of the applicator. Alternatively, at least one finger of a finger collar is offset from the other fingers of the finger collar by a value $v_F$ in the longitudinal direction of the support sleeve. In a preferred embodiment of the invention, every second finger of the finger collar is offset such that the fingers of a finger collar lie in two parallel planes, separated in a longitudinal direction of the support sleeve and extending perpendicular to the longitudinal direction of the support sleeve. The shift $v_F$ is preferably given as a function of the foot diameter $d_F$ of the fingers, i.e. as $v_F = f \times d_F$, wherein f is a factor in the range between 0 (no offset) and 1.5 (maximum offset).

In addition to offsetting individual fingers within a finger collar, neighboring finger collars can also be offset relative to each other in the peripheral direction by an angle $\alpha$ wherein $\alpha$ should be between 0° and 10°. If $\alpha=0°$, i.e. no angular offset is provided, the tips of similar fingers of the finger collars lie on a straight line extending in the longitudinal direction of the applicator. If neighboring finger collars are angularly offset, the tips of similar fingers of the finger collars are disposed along a circulating spiral line.

In a preferred embodiment of the invention, each finger is conical and has a foot diameter $d_F$ in a range between 0.4 mm and 1.0 mm, in particular 0.68 mm. The fingers are preferably rounded at their free ends, wherein a radius R of the rounding is in the range between 0.02 mm and 0.2 mm and in particular 0.05 mm.

Further details and features of the invention can be extracted from the following description of embodiments with reference to the drawing.

BRIEF DESCRIPTION OF THE DRAWING

FIG. 1 shows a side view of an applicator in accordance with a basic structure;

FIG. 2 shows a longitudinal section through the applicator of FIG. 1;

FIG. 3 shows the section III-III of FIG. 2;

FIG. 8 shows a side view of a first embodiment of an inventive applicator;

FIG. 9 shows a longitudinal section through the applicator of FIG. 8;

FIG. 10 shows the section X-X of FIG. 9;

FIG. 11 shows a side view of a second embodiment of the inventive applicator;

FIG. 12 shows a longitudinal section through the applicator of FIG. 11; and FIG. 13 shows the section XIII-XIII of FIG. 12.

DESCRIPTION OF THE PREFERRED EMBODIMENT

Figure 4:
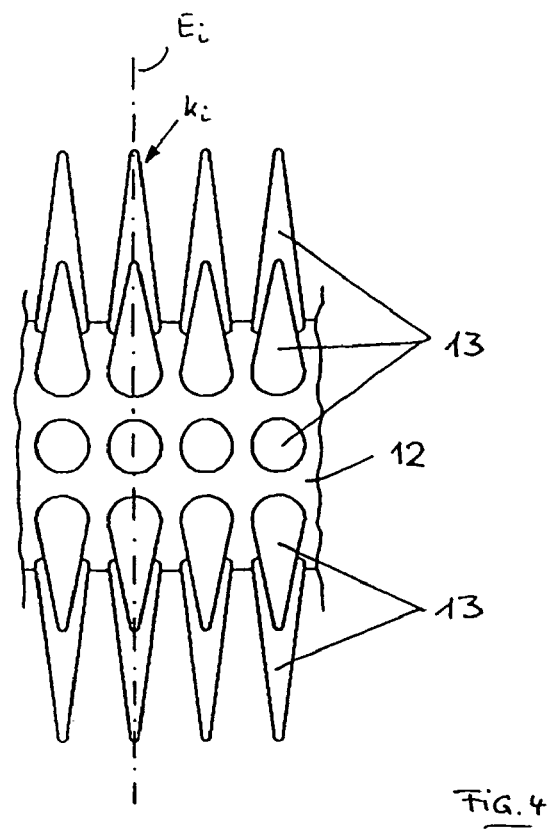
FIG. 4 shows a side view of sections of the applicator of FIG. 1.

FIGS. 1 through 3 show the basic structure of an applicator 10 for explaining the individual parameters in connection with FIGS. 4 through 7.

The applicator 10 has a rod-shaped reinforcing core 11 with a circular cross-section (FIG. 3) which has, at its rear end, connecting elements 11b for mounting to a receiving part (not shown). The core 11 cross-section tapers in its front end region 11e and bears, at its front end 11d, a widened head 11c which serves for positive mounting of the core 11 together with recesses 11a formed in the central section of the core 11. The core 11 consists of a first plastic material and is produced in the first phase of a two-component injection molding method.

In a second phase of the two-component injection molding method, a support sleeve 12 of an elastomeric second plastic material is injected onto the rod-shaped core 11, which is firmly connected to the core 11 via engagement in the recesses 11a and the head 11e of the core 11. The outer contour of the support sleeve 12 is circularly cylindrical and consequently has a constant wall thickness in a central and rear section 12a where it surrounds the middle region of the core 11. The wall thickness steadily increases in the tapering region 11c of the core 11 to compensate for the cross-sectional reduction of the core 11. A front end section 12b of the support sleeve 12 projects past the front end 11d of the core 11 by an amount v (FIG. 2) such that the front end section 12b is completely formed from the elastomeric, second plastic material.

Radially outwardly projecting fingers 13, which conically taper towards their free ends, are integrally formed on the outer side of the support sleeve 12 and are also made from the elastomeric second plastic material. The fingers 13 are arranged in the form of a total of N finger collars, $K_1$, $K_2$, $K_3$, $K_4$, ... $K_{26}$, $K_{27}$ which are disposed at equal separations behind each other in the longitudinal direction of the support sleeve 12. Each finger collar $K_i$ (see FIG. 4) comprises a certain number n of fingers 13, which each lie in a plane $E_i$ extending perpendicular to the longitudinal direction of the support sleeve 12, of which only one is indicated in FIG. 4, and are uniformly distributed at equal angular separations about the periphery of the support sleeve 12. In the embodiment shown in FIGS. 1 through 3, a total of N=27 finger collars are provided, each having n=10 fingers 13. The configuration and design of the fingers 13 is identical for most finger collars. Only the first finger collar $K_1$ formed at the rear end and the two last finger collars $K_{26}$ and $K_{27}$ disposed at the front end of the support sleeve 12 have fingers of reduced size while the finger collars $K_2$ through $K_{25}$ have identical configuration. The statements concerning the size of the fingers 13 always refer to finger collars of identical structure.

As can be seen from FIG. 2, the support sleeve 12 has an overall length L wherein the core 11 projects past the support sleeve 12 at its rear end and has the connecting elements 11b.

FIG. 4 shows that the tips of the fingers 13 of any finger collar $K_i$ lie in a plane $E_i$ extending perpendicular to the longitudinal direction of the support sleeve 12, wherein the planes of neighboring finger collars have a constant mutual separation.

Figure 7:
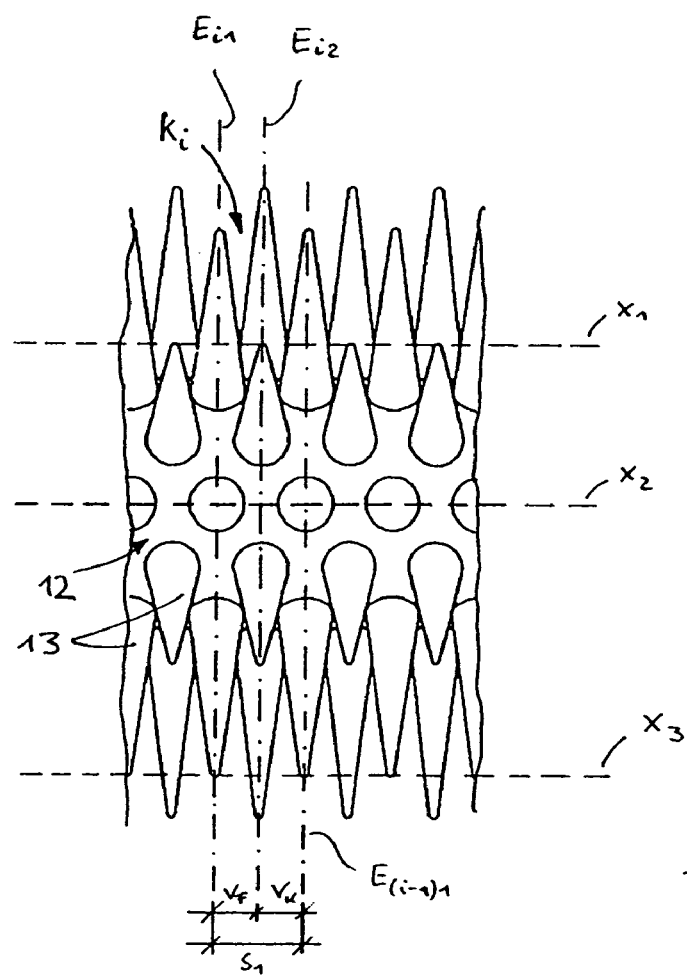
FIG. 7 shows a side view of sections of an applicator with alternative finger configuration.

FIG. 7 shows an alternative embodiment wherein, viewed in the peripheral direction, every second finger 13 of the finger collar $K_i$ is offset relative to the other fingers of the finger collar in the longitudinal direction of the support sleeve 12. As a result, half of the fingers of the finger collar $K_i$ are disposed with their tips in a first plane $E_{i1}$ extending perpendicular to the longitudinal direction of the support sleeve 12 and the other half of the fingers are disposed in a plane $E_{i2}$ which is parallel thereto and offset in the longitudinal direction of the support sleeve 12 by an amount $v_F$. The separation between the planes $E_{i1}$ and $E_{i2}$, i.e. the shift $v_F$ of the fingers in the longitudinal direction of the support sleeve 12 is the same for all finger collars. Furthermore, the plane $E_{i2}$ may have a separation $v_k$ from the plane $E_{(i-1)1}$ of the neighboring finger collar which is equal to the shift $v_F$.

As can be seen in FIG. 7, the individual finger collars are mutually aligned in the longitudinal direction of the support sleeve 12, i.e. have no angular offset in the peripheral direction of the support sleeve 12. The tips of corresponding fingers of the individual finger collars therefore lie on straight connecting lines which extend parallel to the longitudinal axis of the support sleeve 12, of which FIG. 7 exemplarily shows the three lines $x_1$, $x_2$ and $x_3$.

Figure 5:
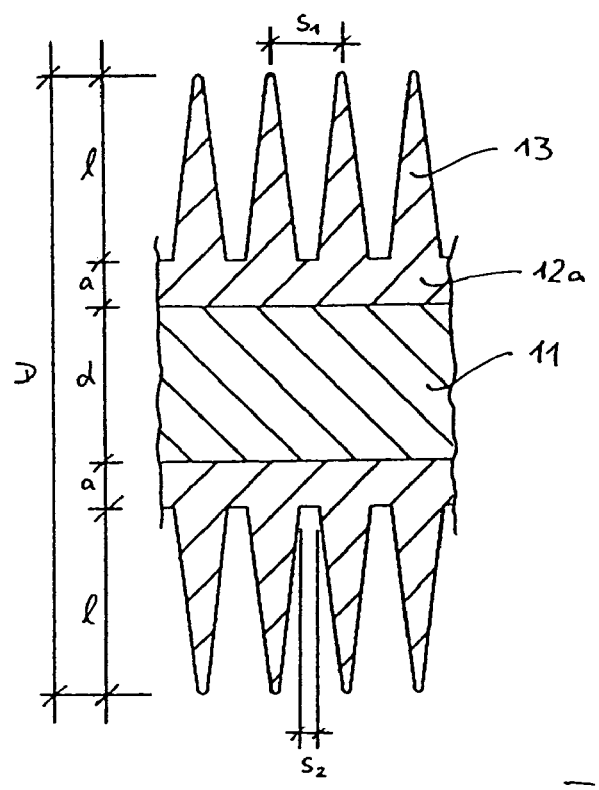
FIG. 5 shows a longitudinal section of sections of the applicator of FIG. 1.

FIG. 5 shows the geometrical relationships in the central region of the applicator 10. The core 11 section of constant circular cross-section has an outer diameter d and is surrounded by the support sleeve 12 having a wall thickness a. The outer side of the support sleeve 12 bears the fingers 13 which project outwardly and which are conical, i.e. taper conically towards the free ends with a radial length l. The overall diameter d of an envelope surface of the applicator is therefore:

$$D = d + 2a + 2l.$$

Figure 6:
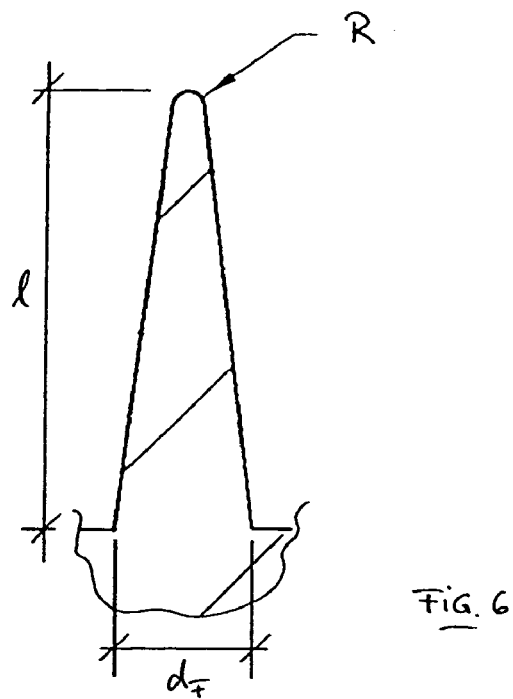
FIG. 6 shows a longitudinal section through a finger in an enlarged scale.

The associated fingers 13 of neighboring finger collars have a mutual separation $s_1$ at their free ends while the finger feet of associated fingers of neighboring finger collars have a clearance separation $s_2$ (FIG. 5). The fingers 13 have the shape of a circular cone and the base or connecting surface of the finger has a diameter $d_F$ (FIG. 6). The fingers are rounded at their outer free ends with a radius R.

The following ranges have proven to be useful for the individual parameters:
1. overall diameter D of the applicator: 6.0 mm to 10.0 mm
2. core diameter d: 1.5 mm to 2.5 mm
3. wall thickness a of the support sleeve: 0.3 mm to 1.0 mm
4. finger length l: 1.5 mm to 3.0 mm
5. separation $s_1$ of the finger tips of neighboring finger collars: 0.6 mm to 1.5 mm
6. separation $s_2$ of the finger feet of neighboring finger collars: 0.2 mm to 0.5 mm
7. overall length L of the support sleeve: 20.0 mm to 35.0 mm
8. length v of the front region which is not reinforced: 1.0 mm to 8.0 mm
9. number n of fingers per finger collar: 8 to 16, in particular 8, 10, 12 or 16
10. number N of finger collars: 14 to 30
11. diameter $d_F$ of the finger foot: 0.4 mm to 1.0 mm
12. rounding radius R of the finger tip: 0.02 mm to 0.2 mm
13. axial offset $v_F$ of the fingers of a finger collar $v_F = f \times d_F$, wherein $0 \leq f \leq 1.5$
14. offset angle $\alpha$ of neighboring finger collars in the peripheral direction: $0° \leq \alpha \leq 10°$.

FIGS. 8 through 10 show a first concrete embodiment of an applicator 10. It differs from the basic structure shown in FIGS. 1 through 3 by having a special parameter combination, wherein a total of N=27 finger collars are provided of which the rear first finger collar $K_1$ and the two front collars $K_{26}$ and $k_{27}$ are reduced in size. All other finger collars $K_2$ to $K_{25}$ have the same configuration with n=10 fingers uniformly distributed over the periphery of the support sleeve 12, wherein every other finger of each finger collar is offset relative to the other fingers by $v_F=s_1/2=f \times d_F=0.48$ mm, wherein $f=0.7$. The exact parameter values are given in the following list:

| | | |
|---|---|---|
| D = 8.0 mm | $s_2$ = 0.25 mm | $d_F$ = 0.68 mm |
| d = 2.0 mm | L = 25.0 mm | $v_F$ = 0.48 mm |
| a = 0.6 mm | v = 3.0 mm | R = 0.05 mm |
| l = 2.4 mm | n = 10 | α = 0° |
| $s_1$ = 0.95 mm | N = 27 | |

FIGS. 11 through 13 show a further embodiment with an advantageous parameter combination, wherein the rear first two finger collars $K_1$ and $K_2$ and the front last finger collar $K_{22}$ have fingers of reduced size and five additional small fingers 18 are formed at the front end of the support sleeve 12 and are distributed about the periphery of the support sleeve 12 but are not part of a finger collar. Also herein, every other finger of the finger collar is offset by $v_F=s_1/2=f \times d_F=0.48$ mm in the longitudinal direction of the support sleeve 12 relative to the other fingers.

The exact parameter values are given in the following list:

| | | |
|---|---|---|
| D = 8.0 mm | $s_2$ = 0.42 mm | $d_F$ = 0.68 mm |
| d = 2.0 mm | L = 25.0 mm | $v_F$ = 0.48 mm |
| a = 0.6 mm | v = 3.0 mm | R = 0.05 mm |
| l = 2.4 mm | n = 12 | α = 0° |
| $s_1$ = 1.2 mm | N = 22 | |

We claim:

1. An applicator for liquid or pasty media and for decorative cosmetics such as mascara, the applicator comprising:
   a rod-shaped reinforcing core made from a first plastic material; and
   a support sleeve made from a second plastic material, said support sleeve surrounding said core at least in a region of a front end thereof, said support sleeve having a plurality of radially outwardly projecting fingers which are integrally formed on said support sleeve and which are made from said second plastic material, wherein a plurality of said fingers are distributed over a periphery of said support sleeve to form a finger collar ($K_1$, $K_2$, $K_3$ ... ), wherein a plurality N of finger collars ($K_1$, $K_2$, $K_3$ ... ), with equal numbers n of fingers, are disposed one behind the other in a longitudinal direction of said support sleeve wherein:
   I. a number n of fingers per finger collar ($K_1$, $K_2$, $K_3$ ... ) ranges from 8 to 16;
   II. a number N of finger collars ($K_1$, $K_2$, $K_3$ ... ), lying one behind the other in an axial direction of said support sleeve, ranges from $14 \leq N \leq 30$;
   III. a length l of fingers ranges from 1.5 mm $\leq l \leq$ 3.0 mm;
   IV. a separation $s_1$ of free ends of similar fingers of neighboring finger collars ($K_1$, $K_2$, $K_3$ ... ) ranges from 0.6 mm $\leq s_1 \leq$ 1.5 mm;
   V. a separation $s_2$ between feet of fingers of neighboring finger collars ($K_1$, $K_2$, $K_3$ ... ) ranges from 0.2 mm $\leq s_2 \leq$ 0.5 mm; and
   VI. an applicator outer diameter D in a range between 6.0 mm and 10.0 mm.

2. The application of claim 1, wherein $20 \leq N \leq 27$.

3. The applicator of claim 1, wherein:

| | |
|---|---|
| I. | n = 10 |
| II. | N = 27 |
| III. | l = 2.4 mm |
| IV. | $s_1$ = 0.95 mm |
| V. | $s_2$ = 0.25 mm. |

4. The applicator of claim 1, wherein:

| | |
|---|---|
| I. | n = 12 |
| II. | N = 22 |
| III. | l = 2.4 mm |
| IV. | $s_1$ = 1.2 mm |
| V. | $s_2$ = 0.42 mm. |

5. The applicator of claim 1, wherein fingers of said finger collar ($K_1$, $K_2$, $K_3$ ... ) are uniformly distributed about a periphery of said support sleeve.

6. The applicator of claim 1, wherein said outer diameter D of the applicator is 8.0 mm.

7. The applicator of claim 1, wherein an outer diameter d of said core is in a range between 1.5 mm and 2.5 mm.

8. The applicator of claim 7, wherein said outer diameter d of said core is 2.0 mm.

9. The applicator of claim 1, wherein said core tapers at a front end thereof.

10. The applicator of claim 1, wherein said support sleeve has a radial wall thickness a in a range between 0.3 mm and 1.0 mm.

11. The applicator of claim 10, wherein said radial wall thickness a of said support sleeve is 0.6 mm.

12. The applicator of claim 1, wherein said support sleeve and said fingers consist essentially of an elastomeric plastic material.

13. The applicator of claim 1, wherein said support sleeve has an axial length L in a range between 20.0 mm and 35.0 mm.

14. The applicator of claim 13, wherein said axial length L of said support sleeve is 25.0 mm.

15. The applicator of claim 1, wherein said support sleeve has a front end section which projects past a front end of said core by an amount v, wherein v is in a range between 1.0 mm and 8.0 mm.

16. The applicator of claim 15, wherein v is 3.0 mm.

17. The applicator of claim 1, wherein at least one finger of a finger collar is offset in a longitudinal direction of said support sleeve relative to other fingers of that finger collar by an amount $V_F$.

18. The applicator of claim 17, wherein every other finger of said finger collar is offset.

19. The applicator of claim 17, wherein $$v_F = f \times d_F$$

with $d_F$ being a foot diameter of a finger and f a factor in a range between 0 and 1.5.

20. The applicator of claim 1, wherein neighboring finger collars ($K_1$, $K_2$, $K_3$ ... ) are mutually offset in a peripheral direction by an angle α, wherein 0° < α < 10°.

21. The applicator of claim 1, wherein a foot diameter $d_F$ of a finger is in a range between 0.4 mm and 1.0 mm.

22. The applicator of claim 21, wherein said foot diameter $d_F$ of said finger is 0.68 mm.

23. The applicator of claim 1, wherein said fingers have a conical or pyramid shape and are rounded at free ends thereof.

24. The applicator of claim 23, wherein a radius R of said rounded free ends is in a range between 0.02 mm and 0.2 mm.

25. The applicator of claim 24, wherein said radius R of said rounded free ends is 0.05 mm.

* * * * *